(12) United States Patent
Gruchala et al.

(10) Patent No.: US 7,263,346 B2
(45) Date of Patent: Aug. 28, 2007

(54) METHOD AND SYSTEM FOR ENABLING MOBILE USERS TO MANAGE CELLS

(75) Inventors: Carol Shifrin Gruchala, Naperville, IL (US); Wayne Robert Heinmiller, Elgin, IL (US); Dianna Inara Tiliks, Palatine, IL (US); John Wesley Moss, Lake Zurich, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 255 days.

(21) Appl. No.: 11/125,441

(22) Filed: May 10, 2005

(65) Prior Publication Data

US 2006/0258329 A1    Nov. 16, 2006

(51) Int. Cl.
*H04M 11/00* (2006.01)
(52) U.S. Cl. .................. 455/405; 455/406; 455/414.1; 455/415
(58) Field of Classification Search ........ 455/405–407, 455/414.1, 415, 567
See application file for complete search history.

(56) References Cited

U.S. PATENT DOCUMENTS

| | | | |
|---|---|---|---|
| 6,256,504 B1 * | 7/2001 | Tell et al. ................ 455/456.2 |
| 6,397,055 B1 * | 5/2002 | McHenry et al. ........... 455/408 |
| 6,868,268 B2 | 3/2005 | Worsham et al. | |
| 2002/0151293 A1 | 10/2002 | Tysor | |
| 2002/0193092 A1 | 12/2002 | Bhogal et al. | |
| 2004/0038672 A1 * | 2/2004 | Nguyen et al. ............. 455/415 |
| 2004/0063422 A1 | 4/2004 | Nickum | |
| 2004/0072544 A1 * | 4/2004 | Alexis ...................... 455/74.1 |
| 2004/0203641 A1 * | 10/2004 | Hazlewood .............. 455/414.1 |
| 2004/0209595 A1 | 10/2004 | Bekanich | |
| 2005/0032505 A1 | 2/2005 | Himelhoch | |
| 2005/0096021 A1 * | 5/2005 | Benco et al. ............... 455/415 |

\* cited by examiner

*Primary Examiner*—Lester G. Kincaid
*Assistant Examiner*—Steven Lim
(74) *Attorney, Agent, or Firm*—Brooks Kushman P.C.

(57) ABSTRACT

A method for a user to manage calls includes provisioning the user with mobile minutes for calls within the same provider and usage minutes for usage calls. Upon a call between the user and another user it is determined whether the users have the same provider. The call is a mobile call within the same provider if the users have the same provider and is a usage call if the users have different providers. The call is completed if the call is a mobile call within the same provider and if the user has unlimited mobile minutes. If the call is a mobile call within the same provider and if the user has limited mobile minutes and if the some of the mobile minutes remain, then the user is advised accordingly. The call is a usage call if no mobile minutes remain regardless if the call is a mobile call within the same provider. The user is advised accordingly if the call is a usage call.

19 Claims, 3 Drawing Sheets

METHOD AND SYSTEM FOR ENABLING MOBILE USERS TO MANAGE CELLS

BACKGROUND OF THE INVENTION

1. Field of the Invention

The present invention generally relates to wireless telephone methods and systems.

2. Background Art

Wireless telephone service providers offer discounts to their mobile users for mobile to mobile calls made between mobile users belonging to the same service provider. A mobile user is a telephone user having a wireless telephone such as a cellular telephone. A mobile to mobile call is a telephone call made between two mobile users. A mobile to mobile call within the same service provider is a telephone call made between two mobile users belonging to the same service provider.

A mobile user belongs to a service provider by having a service contract with the service provider. The service provider provides mobile service to the mobile user in accordance with the service contract. Upon receiving mobile service from a service provider, a mobile user is able to make calls with other mobile users (belonging to the same or different service providers) and with other land-line users. A land-line user is a telephone user having a land-line telephone connected to the public switched telephone network (PTSN).

Service providers generally provide their mobile users with monthly minutes for their mobile users to use for calls with other telephone users (i.e., other mobile users and land-line users) in a given month. Some service providers generally categorize the monthly minutes into two sets: (i) mobile to mobile minutes for calls which are mobile to mobile calls within the same service provider; and (ii) usage minutes for calls which are usage calls. Usage calls are calls which are not mobile to mobile calls within the same service provider. A call between a mobile user belonging to a service provider and another mobile user belonging to a different service provider is a usage call. Likewise, a call between a mobile user belonging to a service provider and a land-line user is a usage call.

Service providers offer a variety of monthly minute call packages to their mobile users. For example, service providers provide mobile users with unlimited mobile to mobile minutes for mobile to mobile calls within the same service provider. In this instance, a mobile user belonging to a service provider has unlimited minutes for calls with other mobile users belonging to the same service provider. That is, the service provider does not charge any minutes (mobile to mobile or usage minutes) against the mobile user for calls with other mobile users belonging to the same service provider.

As another example, service providers provide their mobile users with a limited number of mobile to mobile minutes for mobile to mobile calls within the same service provider. In this instance, a mobile user belonging to a service provider is allotted a limited number of mobile to mobile minutes for calls with other mobile users belonging to the same service provider. That is, the service provider charges mobile to mobile minutes against the mobile user for calls with other mobile users belonging to the same service provider. As such, once the mobile user has exhausted the allotted number of mobile to mobile minutes, the service provider treats additional mobile to mobile calls within the same service provider as usage calls and charges usage minutes against the mobile user for these additional mobile to mobile calls.

Service providers charge usage minutes against their mobile users for usage calls (i.e., calls that are not mobile to mobile calls within the same service provider or mobile to mobile calls within the same service provider that are treated as usage calls). As such, service providers charge usage minutes against their mobile users for calls with other mobile users belonging to different service providers. Likewise, service providers charge usage minutes against their mobile users for calls with land-line users. As indicated above, service providers charge usage minutes against their mobile users for mobile to mobile calls within the same service provider once their mobile users have exhausted their allotted number of mobile to mobile minutes. Further, once mobile users have exhausted their allotted number of usage minutes, service providers charge extra usage fees against their mobile users for additional usage calls.

A problem is that when a mobile user originates or receives a telephone call to/from another telephone user (i.e., another mobile user or a land-line user), the mobile user may not know whether the call is a mobile to mobile call within the same service provider. If the call is a mobile to mobile call within the same service provider and if the mobile user has an allotted limited number of mobile to mobile minutes for mobile to mobile calls within the same service provider, then another problem is that the mobile user probably does not know how many of the allotted mobile to mobile minutes are left for the mobile user to use before the service provider charges usage minutes against the mobile user.

DETAILED DESCRIPTION OF THE PREFERRED EMBODIMENT(S)

Figure 1:
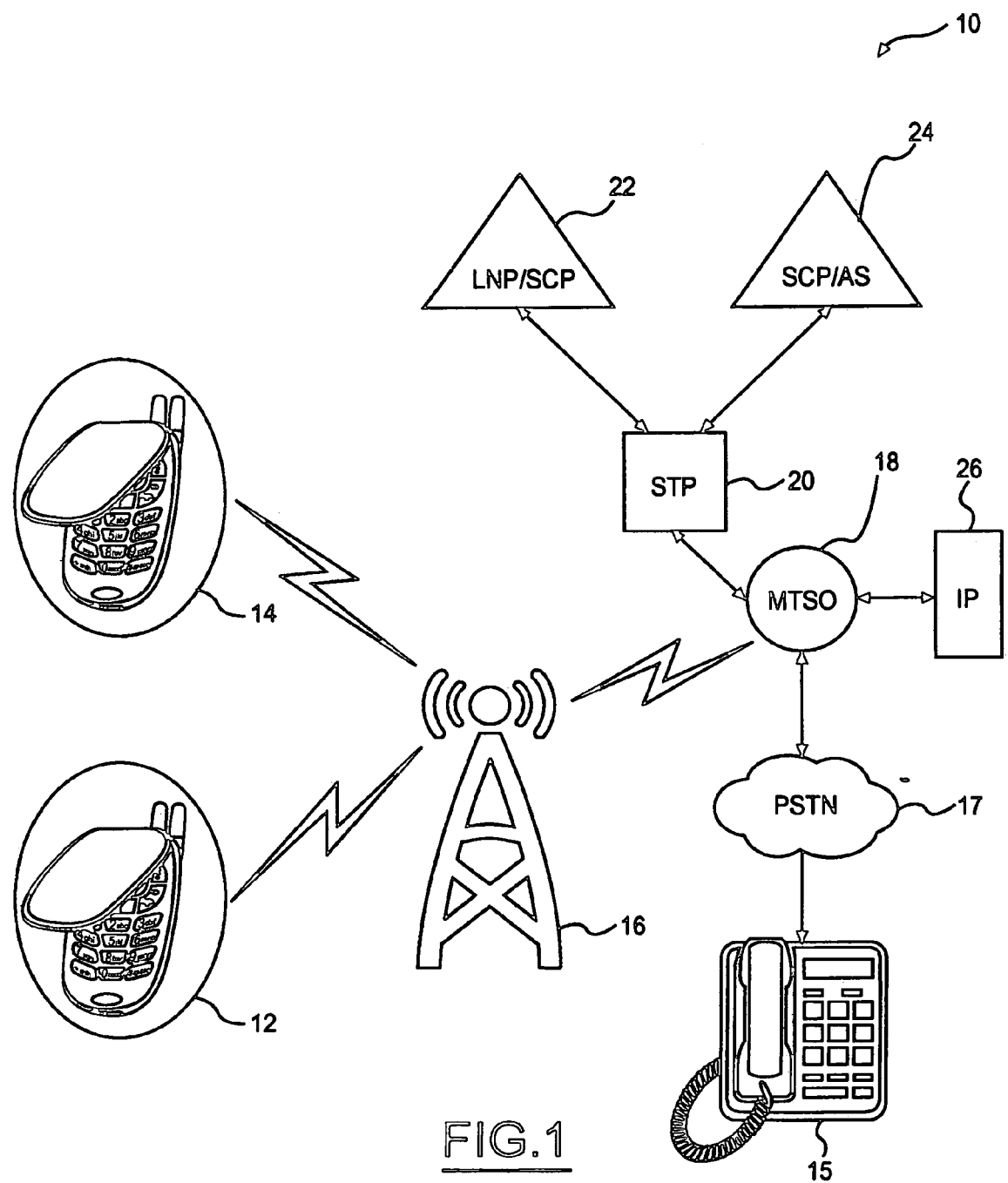
FIG. 1 illustrates a telephone network for implementing the method and system for enabling mobile users to manage calls in accordance with an embodiment of the present invention.

The method and system for enabling mobile users to manage calls in accordance with the present invention has many advantages. In general, the method and system in accordance with the present invention enable service providers to provide a "mobile usage manager" service for their mobile users. A mobile user that subscribes to the mobile usage manager is able to screen originating and incoming calls and decide whether to allow the calls to terminate. The mobile user is able to decide whether to allow the calls to terminate based on whether the calls are mobile to mobile calls within the same service provider and, if so, whether the mobile user has enough of an allotted number of mobile to mobile minutes remaining for such calls before the service provider charges usage minutes against the mobile user.

If a call between the mobile user and another mobile user is a mobile to mobile call within the same service provider and if the mobile user has an unlimited number of mobile to mobile minutes for mobile to mobile calls within the same service provider, then the mobile usage manager allows the call to terminate without any authorization required by the mobile user.

If a call between the mobile user and another mobile user is a mobile to mobile call within the same service provider and if the mobile user has a limited number of mobile to mobile minutes for mobile to mobile calls within the same service provider, then the mobile usage manager provides an indication regarding same to the mobile user. This indication generally indicates to the mobile user one or more of the following pieces of information: (i) the call is a mobile to mobile call within the same provider; (ii) the number of the mobile to mobile minutes remaining for the mobile user to use before the service provider charges usage minutes against the mobile user for the call; (iii) the number of mobile to mobile minutes exhausted by the mobile user for previous mobile to mobile calls within the same service provider; and (iv) identification information (such as name and telephone number) of the other mobile user. Based on the indication, the mobile user can decide to allow the call to terminate knowing that the service provider will charge mobile to mobile minutes against the mobile user for the call if mobile to mobile minutes are remaining or that the service provider will charge usage minutes against the mobile user for the call if the mobile to mobile minutes have been exhausted. Conversely, the mobile user can decide to instruct the service provider to prevent the call from terminating based on the indication.

If a call between the mobile user and another telephone user is not a mobile to mobile call within the same service provider (which occurs when either the other telephone user is a mobile user belonging to a different service provider or the other telephone user is a land-line user), then the mobile usage manager provides an indication regarding same to the mobile user. This indication generally indicates to the mobile user one or more of the following pieces of information: (i) the call is not a mobile to mobile call within the same service provider; (ii) the number of usage minutes remaining for the mobile user to use before the service provider charges extra fees against the mobile user for the call; (iii) the number of usage minutes exhausted by the mobile user for previous usage calls; and (iv) identification information (such as name and telephone number) of the other telephone user. Based on the indication, the mobile user can decide to allow the call to terminate knowing that the service provider will charge usage minutes or extra fees against the mobile user for the call. Conversely, based on the indication, the mobile user can decide to instruct the service provider to prevent the call from terminating knowing that the service provider will charge usage minutes or extra fees against the mobile user for call.

Referring now to FIG. 1, a telephone network 10 for implementing the method and system for enabling mobile users to manage calls in accordance with an embodiment of the present invention is shown. Network 10 generally enables a first mobile user 12 to make calls with a second mobile user 14 and a land-line user 15. More particularly, network 10 enables first mobile user 12 and second mobile user 14 to make mobile to mobile calls with one another. Likewise, network 10 enables first mobile user 12 and land-line user 15 to make telephone calls with one another.

For example, first mobile user 12 may originate a call to second mobile user 14. In this case, the call is designated as an originating mobile to mobile call. The call is a mobile to mobile call within the same service provider if first and second mobile users 12 and 14 belong to the same service provider. Alternatively, the call is not a mobile to mobile call within the same service provider if first and second mobile users 12 and 14 belong to different service providers. In this case, the call is a usage call.

As another example, first mobile user 12 may receive a call from second mobile user 14. In this case, the call is designated as a terminating mobile to mobile call. The call is a mobile to mobile call within the same service provider if first and second mobile users 12 and 14 belong to the same service provider. Alternatively, the call is not a mobile to mobile call within the same service provider if first and second mobile users 12 and 14 belong to different service providers. In this case, the call is a usage call.

As another example, first mobile user 12 may originate a call to land-line user 15. In this case, the call is a usage call and is not a mobile to mobile call (as land-line user 15 does not belong to a service provider). Likewise, for example, first mobile user 12 may receive a call from land-line user 15. In this case, the call is a usage call and is not a mobile to mobile call.

Network 10 generally embodies an advanced intelligent network (AIN) having the following general features. First, network 10 can affect the routing of a call based on some criteria other than the normal criteria of simply finding a path through the network for the call based on the telephone number originally dialed. Second, network 10 enables a mobile user to inject intelligence into the network and affect the flow of a call to be established (originating or terminating) with the mobile user.

In accordance with the present invention, network 10 includes a mobile telephone switching office (MTSO) 18 which wirelessly communicates with mobile users via a cellular tower 16. General functions handled by MTSO 18 include monitoring calls, keeping track of the location of the mobile users, keeping track of billing, switching calls to a wire-based (land-line) central office of the public switched telephone network (PTSN) 17, etc. Network 10 further includes a signal transfer point (STP) 20, a local number portability/signal control point (LNP/SCP) 22, and a signal control point/application server (SCP/AS) 24. STP 20 communicates messages between MTSO 18, LNP/SCP 22, and SCP/AS 24.

SCP/AS 24 generally stores subscription information about mobile users. For example, the subscription information of a mobile user includes information regarding the service provider of the mobile user and includes provisioning information regarding the mobile to mobile minutes and usage minutes provisioned for use by the mobile user. LNP/SCP 22 also generally stores information regarding the service providers of mobile users.

Network 10 further includes an intelligent peripheral 26. Intelligent peripheral 26 is an AIN device which provides voice recordings for use by MTSO 18 in accordance with the present invention. It is noted that MTSO 18 may also store voice recordings for its use in accordance with the present invention. In this case, intelligent peripheral 26, if provided, augments MTSO 18 with additional voice recordings for use by the MTSO.

In accordance with the present invention, MTSO 18, LNP/SCP 22, and SCP/AS 24 are operable with one another to enable service providers to provide the mobile usage manager service for their mobile users. As generally described above, mobile users that subscribe to the mobile usage manager service are able to screen originating and incoming calls and decide whether to allow these calls to terminate.

The general operation of network 10 in accordance with an embodiment of the present invention will now be described. It is assumed that first mobile user 12 is a subscriber to the mobile usage manager service and that a first service provider provides mobile service to the first mobile user. In operation of network 10, originating calls from first mobile user 12 and incoming calls to the first mobile user encounter an AIN trigger at MTSO 18. MTSO 18 halts the processing of a call in response to being triggered.

If the call is an originating call from first mobile user 12 to a telephone user, MTSO 18 queries SCP/AS 24 to inquire as to the identity of the service provider that is providing mobile service to the first mobile user. In accordance with this example, SCP/AS 24 has stored information that identifies the first service provider as being the service provider of the first mobile user. As such, in response to the inquiry, SCP/AS 24 determines that the first service provider is the service provider of first mobile user 12. If the telephone user being called by first mobile user 12 is a mobile user belonging to the first service provider, then either SCP/AS 24 and/or LNP/SCP 22 has stored information indicating same. Accordingly, if SCP/AS 24 does not have stored information indicating that the telephone user belongs to the first service provider, then the SCP/AS 24 queries LNP/SCP 22 to see if the LNP/SCP has such stored information.

If either SCP/AS 24 or LNP/SCP 22 has stored information indicating that the telephone user belongs to the first service provider, then the SCP/AS 24 determines that first mobile user 12 and the telephone user belong to the same service provider. In turn, SCP/AS 24 determines that the call is a mobile to mobile call within the same service provider. If neither SCP/AS 24 nor LNP/SCP 22 has stored information indicating that the telephone user belongs to the first service provider, then the SCP/AS determines that first mobile user 12 and the telephone user do not belong to the same service provider. In turn, SCP/24 determines that the call is a usage call regardless of whether the telephone user is a mobile user or a land-line user.

If the call is a terminating call from the telephone user to first mobile user 12, MTSO 18 queries SCP/AS 24 to inquire as to the identity of the service provider that is providing mobile service to the first mobile user. Again, SCP/AS 24 determines that first mobile user 12 belongs to the first service provider from the first mobile user information stored by the SCP/AS. Based on service provider information (if any) stored in SCP/AS 24 and/or LNP/SCP 22 for the telephone user, the SCP/AS determines whether first mobile user 12 and the telephone user belong to the same service provider. If first mobile user 12 and the telephone user belong to the same service provider, then SCP/AS 24 determines that the call is a mobile to mobile call within the same service provider. If first mobile user 12 and the telephone user do not belong to the same service provider, then SCP/AS 24 determines that the call is a usage call regardless of whether the telephone user is a mobile user or a land-line user.

In sum, SCP/AS 24 determines whether called (originating) and calling (terminating) telephone users are mobile users belonging to the same service provider. SCP/AS 24 makes this determination in order to determine whether a call is a mobile to mobile call within the same service provider.

In general, if SCP/AS 24 determines that a call from/to first mobile user 12 is a mobile to mobile call within the same service provider and that the first mobile user has an unlimited number of mobile to mobile minutes, then the SCP/AS returns a suitable response message to MTSO 18. MTSO 18 then allows the call to terminate without requiring authorization from first mobile user 12. If SCP/AS 24 determines that a call from/to first mobile user 12 is a mobile to mobile call within the same service provider and that the first mobile user has a limited number of mobile to mobile minutes, then the SCP/AS responds in a number of different ways depending upon options chosen by the first mobile user and whether the call is originating or terminating. If SCP/AS 24 determines that a call from/to first mobile user 12 is not a mobile to mobile call within the same service provider (i.e., a usage call), then the SCP/AS also responds in a number of different ways depending upon options chosen by the first mobile user and whether the call is originating or terminating.

Figure 2:
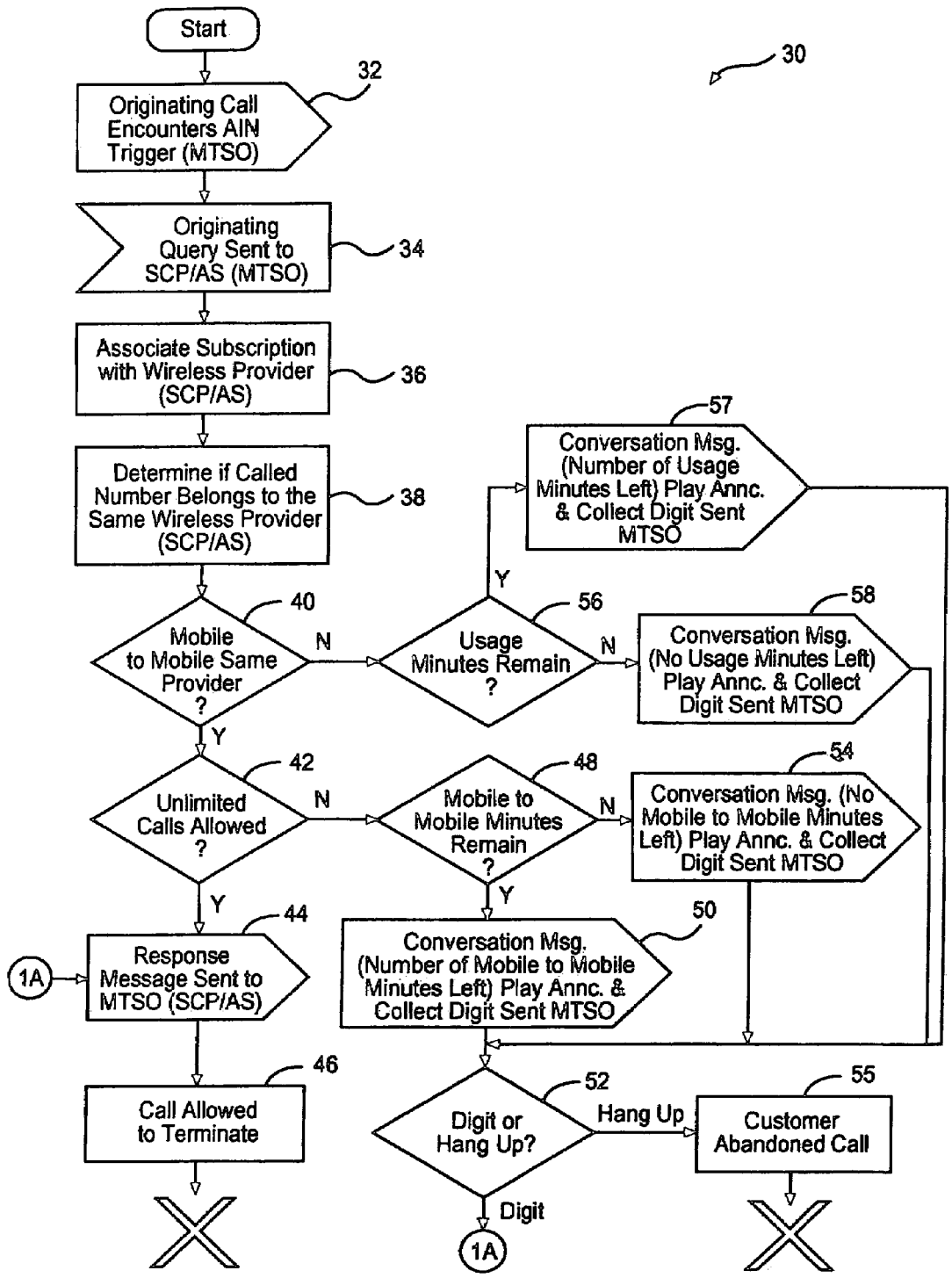
FIG. 2 illustrates a flowchart describing originating call operation of the method and system in accordance with an embodiment of the present invention.

Referring now to FIG. 2, with continual reference to FIG. 1, a flowchart 30 describing originating call operation of the method and system in accordance with an embodiment of the present invention is shown. The mobile usage manager service provides the originating call operation to first mobile user 12 in response to the first mobile user making a call to another telephone user such as second mobile user 14 or land-line user 15. Again, it is assumed that first mobile user 12 belongs to a first service provider and that the first mobile user is a subscriber to the mobile usage manager service.

The originating call operation initially begins with the originating call from first mobile user 12 encountering an AIN trigger at MTSO 18 as shown in block 32. In response, MTSO 18 halts the processing of the call and sends an originating query to SCP/AS 24 as shown in block 34. In response to the originating query, SCP/AS 24 determines the association of first mobile user 12 with a service provider as shown in block 36. More particularly, SCP/AS 24 determines the service provider of first mobile user 12 and the mobile to mobile minutes and usage minutes provisioned for use by the first mobile user based on subscription information stored by the SCP/AS for the first mobile user. In this example, this information identifies the first service provider as being the service provider for first mobile user 12. SCP/AS 24 then determines if the telephone user is a mobile user belonging to the first service provider based on information stored in the SCP/AS and/or LNP/SCP 22 as shown in block 38.

If first mobile user 12 and the telephone user belong to the same service provider, then SCP/AS 24 determines in block 40 that the call is a mobile to mobile call within the same service provider. If first mobile user 12 and the telephone user do not belong to the same service provider, then SCP/AS 24 determines in block 40 that the call is a usage call (i.e., the SCP/AS determines that the call is not a mobile to mobile call within the same service provider).

If the call is a mobile to mobile call within the same service provider, then SCP/AS 24 determines whether first mobile user 12 has unlimited mobile to mobile minutes for mobile to mobile calls within the same service provider as shown in block 42. If so, then SCP/AS 24 sends a response message indicating same to MTSO 18 as shown in block 44. MTSO 18 then allows the call from first mobile user 12 to terminate to the telephone user as shown in block 46 without requiring authorization by the first mobile user.

If SCP/AS 24 determines in block 42 that first mobile user 12 has a limited number of mobile to mobile minutes for mobile calls within the same service provider, then the SCP/AS queries MTSO 18 as to how many of the limited number of mobile to mobile minutes are remaining for use by the first mobile user as shown in block 48. If any of the mobile to mobile minutes are remaining, then SCP/AS 24 responds with a conversation message to MTSO 18 to play an announcement to first mobile user 12 as shown in block

50. MTSO 18 is able to play announcements on its own or interacts with intelligent peripheral 26 to play announcements. This announcement indicates to first mobile user 12 how many of the allotted mobile to mobile minutes are remaining for use by the first mobile user. This announcement includes a request that first mobile user 12 enter a digit on the wireless phone of the first mobile user if the first mobile user wishes to allow the call terminate. This announcement instructs first mobile user 12 to simply hang-up the wireless phone if the first mobile user does not wish to allow the call to terminate to the telephone user.

MTSO 18 then monitors the wireless phone of first mobile user 12 to determine whether the first mobile user has entered the requested digit or hung-up the wireless phone as shown in block 52. If first mobile user 12 enters the requested digit, then SCP/AS 24 sends a response message to MTSO 18 indicating to the MTSO that the first mobile user wishes the call to terminate as shown in block 44. MTSO 18 then allows the call from first mobile user 12 to terminate to the telephone user as shown in block 46. If first mobile user 12 hangs-up the wireless phone at block 52, then MTSO 18 prevents the call from terminating and the call is abandoned as shown in block 55.

If none of the allotted mobile to mobile minutes for first mobile user 12 are remaining at block 48, then SCP/AS 24 responds with a conversation message to MTSO 18 to play an announcement to first mobile user 12 indicating same as shown in block 54. This announcement indicates to first mobile user 12 that no mobile to mobile minutes are left for the first mobile user to use and that the call will be treated as a usage call. This announcement requests that first mobile user 12 enter a digit on the wireless phone of the first mobile user if the first mobile user wishes to allow the call to terminate. This announcement instructs first mobile user 12 to simply hang-up the wireless phone if the first mobile user does not wish to allow the call to terminate to the telephone user. The flow process then continues to block 52 as described above.

Instead of playing the announcement to first mobile user 12 that no mobile to mobile minutes are remaining for use by the first mobile user as described above with reference to block 54, an alternative option is for MTSO 18 to play a tone to the first mobile user identifying the call as a usage call. First mobile user 12 can then decide whether to abandon the call (hang-up) or let the call terminate (remain off hook).

If SCP/AS 24 determines in decision block 40 that the call is not a mobile to mobile call within the same service provider (which occurs when the telephone user being called is a mobile user belonging to a different service provider than the service provider of first mobile user 12 or when the telephone user being called is a land-line user), then the SCP/AS returns a query to MTSO 18 inquiring the MTSO to determine whether the first mobile user has any usage minutes remaining for the call as shown in block 56. In this case, the call is a usage call.

If any of the usage minutes are remaining, then SCP/AS 24 responds with a conversation message to MTSO 18 to play an announcement indicating same to first mobile user 12 as shown in block 57. This announcement indicates to first mobile user 12 that the call is a usage call and indicates how many of the allotted usage minutes are remaining for use by the first mobile user. The announcement includes a request that first mobile user 12 enter a digit on the wireless phone of the first mobile user if the first mobile user wishes to allow the call terminate. The announcement instructs first mobile user 12 to simply hang-up the wireless phone if the first mobile user does not wish to allow the call to terminate to the telephone user. The flow process then continues to block 52 as described above.

If none of the usage minutes are remaining, then SCP/AS 24 responds with a conversation message to MTSO 18 to play an announcement indicating same to first mobile user 12 as shown in block 58. This announcement indicates to first mobile user 12 that the call is a usage call and indicates that no usage minutes are remaining for use by first mobile user 12. The announcement includes a request that first mobile user 12 enter a digit on the wireless phone of the first mobile user if the first mobile user wishes to allow the call terminate. The announcement instructs first mobile user 12 to simply hang-up the wireless phone if the first mobile user does not wish to allow the call to terminate to the telephone user. The flow process then continues to block 52 as described above. Again, instead of the announcement, MTSO 18 could play a tone to first mobile user 12 which identifies the call as a usage call. First mobile user 12 can then decide on abandoning the call or allowing the call to terminate to the telephone user (knowing that the service provider will charge extra usage fees against the first mobile user for the call).

Figure 3:
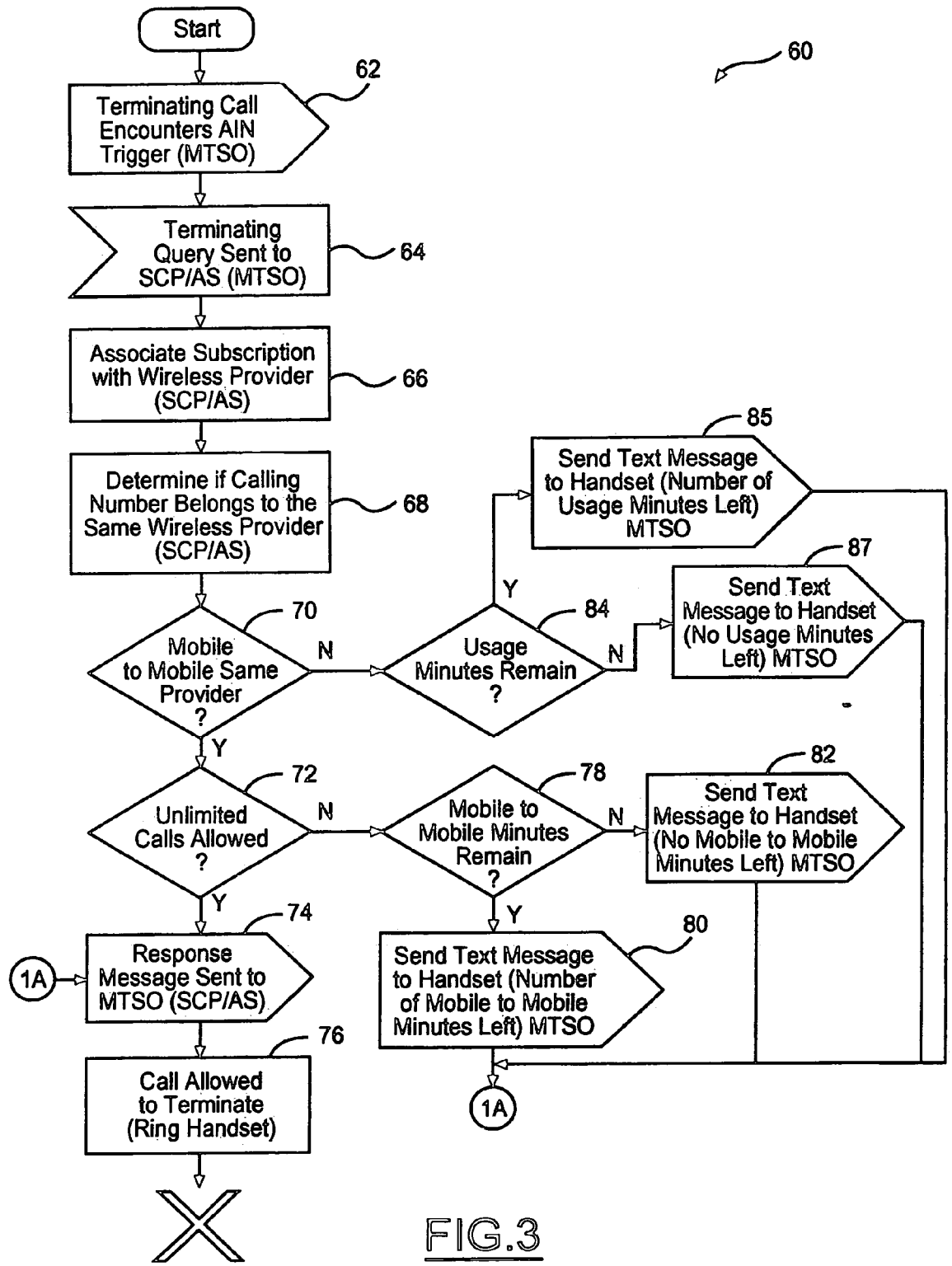
FIG. 3 illustrates a flowchart describing terminating call operation of the method and system in accordance with an embodiment of the present invention.

Referring now to FIG. 3, with continual reference to FIGS. 1 and 2, a flowchart 60 describing terminating call operation of the method and system in accordance with an embodiment of the present invention is shown. The mobile usage manager service provides the terminating call operation to first mobile user 12 in response to the first mobile user receiving a call from another telephone user such as second mobile user 14 or land-line user 15. Again, it is assumed that first mobile user 12 belongs to a first service provider and that the first mobile user is a subscriber to the mobile usage manager service.

The terminating call operation initially begins with the terminating call from a telephone user to first mobile user 12 encountering an AIN trigger at MTSO 18 as shown in block 62. In response, MTSO 18 halts the processing of the call and sends a terminating query to SCP/AS 24 as shown in block 64. In response to the terminating query, SCP/AS 24 determines the association of first mobile user 12 with a service provider as shown in block 66. More particularly, SCP/AS 24 determines the service provider of first mobile user 12 and the mobile to mobile minutes and usage minutes provisioned for use by the first mobile user based on subscription information stored by the SCP/AS for the first mobile user. In this example, this information identifies the first service provider as being the service provider for first mobile user 12. SCP/AS 24 then determines if the telephone user is a mobile user belonging to the first service provider based on information stored in the SCP/AS and/or LNP/SCP 22 as shown in block 68.

If first mobile user 12 and the telephone user belong to the same service provider, then SCP/AS 24 determines in block 70 that the call is a mobile to mobile call within the same service provider. If first mobile user 12 and the telephone user do not belong to the same service provider, then SCP/AS 24 determines in block 70 that the call is a usage call (i.e., the SCP/AS determines that the call is not a mobile to mobile call within the same service provider).

If SCP/AS 24 determines in block 70 that the call is a mobile to mobile call within the same service provider, then the SCP/AS determines whether first mobile user 12 has unlimited mobile to mobile minutes for mobile calls within the same service provider as shown in block 72. If so, then SCP/AS 24 sends a response message indicating same to MTSO 18 as shown in block 74. MTSO 18 then allows the call from the telephone user to terminate to first mobile user 12 as shown in block 76 without requiring authorization by the first mobile user.

If SCP/AS 24 determines in block 72 that first mobile user 12 has a limited number of mobile to mobile minutes for mobile calls within the same service provider, then the SCP/AS queries MTSO 18 as to how many of the limited number of mobile to mobile minutes are remaining for use by the first mobile user as shown in block 78. If any of the mobile to mobile minutes are remaining, then SCP/AS 24 instructs MTSO 18 to generate a text message regarding the number of mobile to mobile minutes remaining for use by first mobile user 12 as shown in block 80. MTSO 18 is able to generate text messages on its own or interacts with intelligent peripheral 26 to generate text messages.

This instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

If none of the allotted mobile to mobile minutes for first mobile user 12 are remaining at block 78, then SCP/AS 24 instructs MTSO 18 to generate a text message indicating same for the first mobile user as shown in block 82. This text message indicates to first mobile user 12 that none of the allotted mobile to mobile minutes are remaining for the first mobile user to use and that the call will be treated as a usage call. The instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

Alternatively, first mobile user 12 can choose an option in which all usage calls are automatically blocked from terminating to the first mobile user. Further, first mobile user 12 can choose an option in which such usage calls are automatically sent to a voice mail system set up for the first mobile user. Further, MTSO 18 can provide to first mobile user 12 an announcement announcing the call as a usage call.

If SCP/AS 24 determines in block 70 that the call is not a mobile to mobile call within the same service provider (which occurs when the telephone user calling first mobile user 12 is a mobile user belonging to a different service provider than the service provider of the first mobile user or when the telephone user is a land-line user), then the SCP/AS returns a query to MTSO 18 inquiring the MTSO to determine whether the first mobile user has any usage minutes remaining for the call. In this case, the call is a usage call.

If any of the usage minutes are remaining, then SCP/AS 24 instructs MTSO 18 to generate a text message for first mobile user 12 indicating same as shown in block 85. This text message indicates to first mobile user 12 that the call is a usage call and further indicates to the first mobile user how many of the allotted usage minutes are remaining for use by the first mobile user. The instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

If none of the usage minutes are remaining, then SCP/AS 24 instructs MTSO 18 to generate a text message for first mobile user 12 indicating same as shown in block 87. This text message indicates to first mobile user 12 that the call is a usage call and further indicates to the first mobile user that none of the allotted usage minutes are remaining for use by the first mobile user. Again, the instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

Again, first mobile user 12 can choose options in which usage calls are automatically blocked from terminating to the first mobile user, usage calls are automatically sent to a voice mail system, etc. Further, MTSO 18 can provide to first mobile user 12 an announcement announcing the call as a usage call.

In accordance with the present invention, the logic operations of the mobile usage manager service for mobile users are provisioned by service providers when the service providers set up the mobile services for their mobile users. The service providers are configured to allow their mobile users to update their provisioned mobile usage manager service logic operations via an interactive voice response or via the Internet. In accordance with the present invention, mobile users with mobile to mobile specified minute (usage) plans will be above to view their minute usage via the Internet.

In sum, in accordance with the present invention, mobile users are able to decide if mobile to mobile calls and usage calls are allowed to be completed and the mobile users are allowed to fully manage their mobile service package contracted with their service providers.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for enabling a mobile user to manage calls, the method comprising:

provisioning a mobile user with mobile to mobile minutes for mobile to mobile calls within the same provider during a given time period and with usage minutes for usage calls during the given time period;

determining whether the mobile user and a telephone user belong to the same provider after a call between the first mobile user and the telephone user being initiated, designating the call as a mobile to mobile call within the same provider if the mobile user and the telephone user belong to the same provider, and designating the call as a usage call if the mobile user and the telephone user do not belong to the same provider, wherein a usage call is a call other than a mobile to mobile call within the same provider;

if the call is a mobile to mobile call within the same provider and if the mobile user is provisioned with unlimited mobile to mobile minutes, then completing the call without requiring authorization by the mobile user;

if the call is a mobile to mobile call within the same provider and if the mobile user is provisioned with a limited number of mobile to mobile minutes and if any of the mobile to mobile minutes are remaining, then advising the mobile user that the call is a mobile to mobile call within the same provider and advising the mobile user the number of mobile to mobile minutes remaining, and then requiring an affirmation from the mobile user to complete the call;

if the call is a mobile to mobile call within the same provider and if none of the mobile to mobile minutes are remaining, then designating the call as a usage call instead of a mobile to mobile call within the same provider; and if the call is a usage call, then advising the mobile user that the call is a usage call and advising the mobile user the number of usage minutes exhausted by the mobile user for usage calls during the given time period, and then requiring an affirmation from the mobile user to complete the call.

2. The method of claim 1 further comprising:
charging mobile to mobile minutes against the mobile user for the call if the call is a mobile to mobile call within the same provider and if the mobile user is provisioned with a limited number of mobile to mobile minutes.

3. The method of claim 1 further comprising:
charging usage minutes against the mobile user for the call if the call is a usage call.

4. The method of claim 1 wherein:
initiating a call between the mobile user and a telephone user includes initiating a call from the mobile user to the telephone user.

5. The method of claim 1 wherein:
initiating a call between the mobile user and a telephone user includes initiating a call from the telephone user to the mobile user.

6. The method of claim 4 wherein:
requiring an affirmation from the mobile user to complete the call to the telephone user includes requesting the mobile user to enter a mobile phone digit if the mobile user wants the call to be completed; and
completing the call upon the mobile user entering the requested mobile phone digit.

7. The method of claim 1 wherein:
advising the mobile user that the call is a usage call includes providing a tone to the mobile user indicating that the call is a usage call.

8. The method of claim 1 wherein:
advising the mobile user the number of exhausted usage minutes includes providing to the mobile user at least one of a text message and a voice recording indicating the number of exhausted usage minutes.

9. The method of claim 1 wherein:
advising the mobile user that the call is a mobile to mobile call within the same provider includes providing to the mobile user at least one of a text message and a voice recording indicating that the call is a mobile to mobile call within the same provider;

advising the mobile user the number of mobile to mobile minutes remaining includes providing to the mobile user at least one of a text message and a voice recording indicating the number of mobile to mobile minutes remaining.

10. The method of claim 1 wherein:
advising the mobile user that the call is a mobile to mobile call within the same provider includes providing a tone to the mobile user indicating that the call is a mobile to mobile call within the same provider.

11. The method of claim 5 further comprising:
enabling the mobile user to direct the call to a voice mail system for the mobile user instead of completing the call to the mobile user.

12. The method of claim 1 further comprising:
charging extra fees against the mobile user for the call if the call is a usage call and if all of the usage minutes are exhausted.

13. A system for enabling a mobile user to manage calls, the system comprising:
a provider for provisioning a first mobile user with mobile to mobile minutes for mobile to mobile calls within the same provider during a given time period and with usage minutes for usage calls during the given time period;
a network for enabling a call between the first mobile user and a telephone user;
a processor for determining whether the telephone user is one of another mobile user or a land-line user;
if the telephone user is another mobile user, then the processor determines whether the mobile users have the same provider, wherein the processor designates the call as a mobile to mobile call within the same provider if the mobile users have the same provider and designates the call as a usage call if the mobile users have different providers, wherein a usage call is a call other than a mobile to mobile call within the same provider;
wherein the processor designates the call as a usage call if the telephone user is a land-line user;
wherein the network completes the call without requiring authorization from the first mobile user if the call is a mobile to mobile call within the same provider and if the first mobile user is provisioned with unlimited mobile to mobile minutes;
wherein if the call is a mobile to mobile call within the same provider the processor advises the first mobile user that the call is a mobile to mobile call within the same provider and advises the first mobile user the number of mobile to mobile minutes remaining if the first mobile user is provisioned with a limited number of mobile to mobile minutes and if any of the limited number of mobile to mobile minutes are remaining, wherein the processor instructs the network to complete the call upon receiving an affirmation from the first mobile user;
wherein if the call is a mobile to mobile call within the same provider the processor designates the call as a usage call instead of a mobile to mobile call within the same provider if none of the mobile to mobile minutes are remaining; and
wherein if the call is a usage call the processor advises the first mobile user that the call is a usage call and instructs the network to complete the call upon receiving an affirmation from the first mobile user.

14. The system of claim 13 wherein:
the processor charges mobile to mobile minutes against the first mobile user for the call if the call is a mobile to mobile call within the same provider and if the first mobile user is provisioned with a limited number of mobile to mobile minutes.

15. The system of claim 13 wherein:
the processor charges usage minutes against the first mobile user for the call if the call is a usage call.

16. The system of claim 13 wherein:
the call is from the first mobile user to the telephone user.

17. The system of claim 13 wherein:
the call is from the telephone user to the first mobile user.

18. A method for enabling a mobile user to manage calls, the method comprising:
provisioning a first mobile user with mobile to mobile minutes for mobile to mobile calls within the same provider during a given time period and with usage minutes for usage calls during the given time period;
determining whether the first mobile user and a second mobile user have the same provider after a call between the mobile users being initiated, designating the call as a mobile to mobile call within the same provider if the mobile users have the same provider, and designating the call as a usage call if the mobile users have different providers, wherein a usage call is a call other than a mobile to mobile call within the same provider;
if the call is a mobile to mobile call within the same provider and if the first mobile user is provisioned with unlimited mobile to mobile minutes, then completing the call without requiring authorization by the first mobile user;
if the call is a mobile to mobile call within the same provider and if the first mobile user is provisioned with a limited number of mobile to mobile minutes and if any of the mobile to mobile minutes are remaining, then advising the first mobile user that the call is a mobile to mobile call within the same provider and advising the first mobile user the number of mobile to mobile minutes remaining, and then requiring an affirmation from the first mobile user to complete the call;
if the call is a mobile to mobile call within the same provider and if none of the mobile to mobile minutes are remaining, then designating the call as a usage call instead of a mobile to mobile call within the same provider; and
if the call is a usage call, then advising the first mobile user that the call is a usage call and requiring an affirmation from the first mobile user to complete the call.

19. The method of claim 18 further comprising:
charging mobile to mobile minutes against the first mobile user for the call if the call is a mobile to mobile call within the same provider and if the first mobile user is provisioned with a limited number of mobile to mobile minutes;
charging usage minutes against the first mobile user for the call if the call is a usage call; and
charging extra fees against the first mobile user for the call if the call is a usage call and if none of the usage minutes are remaining.

\* \* \* \* \*